United States Patent
Schuler

(10) Patent No.: US 6,672,613 B2
(45) Date of Patent: Jan. 6, 2004

(54) VEHICLE STEERING WHEEL

(75) Inventor: Patrik Schuler, Obernburg (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/829,456

(22) Filed: Apr. 10, 2001

(65) Prior Publication Data

US 2001/0030413 A1 Oct. 18, 2001

(30) Foreign Application Priority Data

Apr. 10, 2000 (DE) .......................... 200 06 595

(51) Int. Cl.[7] .......................... B60R 21/16; B60R 21/20
(52) U.S. Cl. ...................... 280/731; 280/728.2; 74/552
(58) Field of Search .................. 280/728.2, 731; 200/61.55, 61.56; 74/552

(56) References Cited

U.S. PATENT DOCUMENTS

| | | | |
|---|---|---|---|
| 5,303,952 A | * 4/1994 | Shermetaro et al. | 280/731 |
| 5,350,190 A | 9/1994 | Szigethy | |
| 5,593,178 A | 1/1997 | Shiga et al. | |
| 5,599,039 A | * 2/1997 | Goss et al. | 280/731 |
| 5,627,352 A | * 5/1997 | Suzuki et al. | 200/61.54 |
| 5,788,268 A | * 8/1998 | Goss et al. | 280/728.2 |
| 6,017,055 A | 1/2000 | Cuevas | |
| 6,193,268 B1 | 2/2001 | Derrick | |
| 6,250,666 B1 | * 6/2001 | Ross | 280/728.2 |
| 6,302,432 B1 | * 10/2001 | Magoteaux et al. | 280/728.2 |

FOREIGN PATENT DOCUMENTS

| | | | |
|---|---|---|---|
| DE | 19850648 | | 5/1999 |
| EP | 0 672 559 A1 | * | 9/1995 |
| EP | 0754600 | | 1/1997 |
| EP | 0926039 | | 6/1999 |
| GB | 2 336 135 A | * | 10/1999 |
| JP | 9-30425 A | * | 4/1997 |
| WO | 9815431 | | 4/1998 |

* cited by examiner

*Primary Examiner*—Paul N. Dickson
*Assistant Examiner*—Ruth Ilan
(74) *Attorney, Agent, or Firm*—Tarolli, Sundheim, Covell & Tummino L.L.P.

(57) ABSTRACT

The invention relates to a vehicle steering wheel including a longitudinal axis, a steering wheel hub, a holding member, and at least one latching connection. The steering wheel further includes a gas bag module which is connected via the at least one latching connection with the holding member and which is displaceably mounted in a direction of the longitudinal axis for actuation of a horn. The latching connection includes a one-piece spring element and a recess, which spring element snaps into the recess and connects the gas bag module and the holding member with each other to form a snap-in connection. In addition, the spring element moves the gas bag module back into a basic position on actuation of a horn.

19 Claims, 3 Drawing Sheets

VEHICLE STEERING WHEEL

TECHNICAL FIELD

The invention relates to a vehicle steering wheel equipped with a displaceably mounted gas bag module.

BACKGROUND OF THE INVENTION

Gas bag modules which are mounted so as to be longitudinally displaceable in the vehicle steering wheel, in order to actuate the horn by means of their movement, are designated as "floating horn modules", i.e. modules which are mounted so as to be floating or displaceable in axial direction. The fastening of such modules to the steering wheel is relatively costly, because a restoring force always has to be provided via a spring element, which endeavors to press the gas bag module into the basic position.

BRIEF SUMMARY OF THE INVENTION

The invention provides a vehicle steering wheel in which the gas bag module can be fastened to the vehicle steering wheel very simply and at a favorable cost. This is achieved in a vehicle steering wheel which comprises a longitudinal axis, a steering wheel hub, a holding member, and at least one latching connection. The steering wheel further comprises a gas bag module which is connected via the at least one latching connection with the holding member and which is displaceably mounted in a direction of the longitudinal axis for actuation of a horn. The latching connection includes a one-piece spring element and a recess, which spring element snaps into the recess and connects the gas bag module and the holding member with each other to form a snap-in connection. In addition, the spring element moves the gas bag module back into a basic position on actuation of a horn. In the gas bag steering wheel according to the invention, the spring element has a multiple function, because it provides on the one hand for the latching- or snap connection by which the module can be simply fastened to the vehicle steering wheel, and on the other hand it provides for the restoring force on actuation of the horn. The numerous parts and spring elements necessary in the prior art are replaced according to the invention by one spring element, several spring elements of course being able to be provided, which in each case undertake part of the latching function and of the restoring function.

Preferably the spring element is a deformed spring plate which is able to be produced at a favorable cost. The spring plate can be embedded in plastic by injection molding and can be constructed as a unit which is able to be fastened separately to the gas bag module or to the holding member.

According to the preferred embodiment, the spring element has several sections which fulfill the various functions. A first section serves to provide the latching connection and a second section serves to provide the restoring force. When the spring element is a spring plate, the first section can be a deformed spring plate section which is V-shaped in cross-section and projects into the recess.

The second section is preferably a bent spring plate section projecting radially with respect to the longitudinal axis.

The second section can press the gas bag module in the basic position against the first section such that the gas bag module is mounted free of play in the basic position. The gas bag module is therefore clamped between the first and the second section.

A very simple construction of the first and second sections can be achieved in that the spring plate has an H-shaped recess through which two sheet metal tongues are defined which are mounted on one side and form the first and second sections, respectively.

An embodiment of the invention makes provision that the spring element is an insert fastened to the holding member or to the gas bag module, i.e. a separate part which can be produced at a favorable cost at a spring manufacturer's and which only has to be fastened to the holding member or to the gas bag module before the gas bag module and holding member are fastened to each other.

The fastening of the insert takes place advantageously by a third section of the spring element, constructed as a spring plate, this third section being able to form a latching connection by which the fastening of the insert to the holding member or to the gas bag module is achieved.

The holding member is preferably the steering wheel hub which is constructed in a cup shape and into which the gas bag module is inserted. The inserting and arresting of the gas bag module in the holding member is further facilitated in that the holding member and the gas bag module have an axially extending guide which positions the gas bag module such that the latter has a predetermined angular position relative to the holding member. Through this guide, preferably the mounting position of the gas bag module is clearly defined, too.

DETAILED DESCRIPTION OF THE PREFERRED EMBODIMENTS

Figure 1:
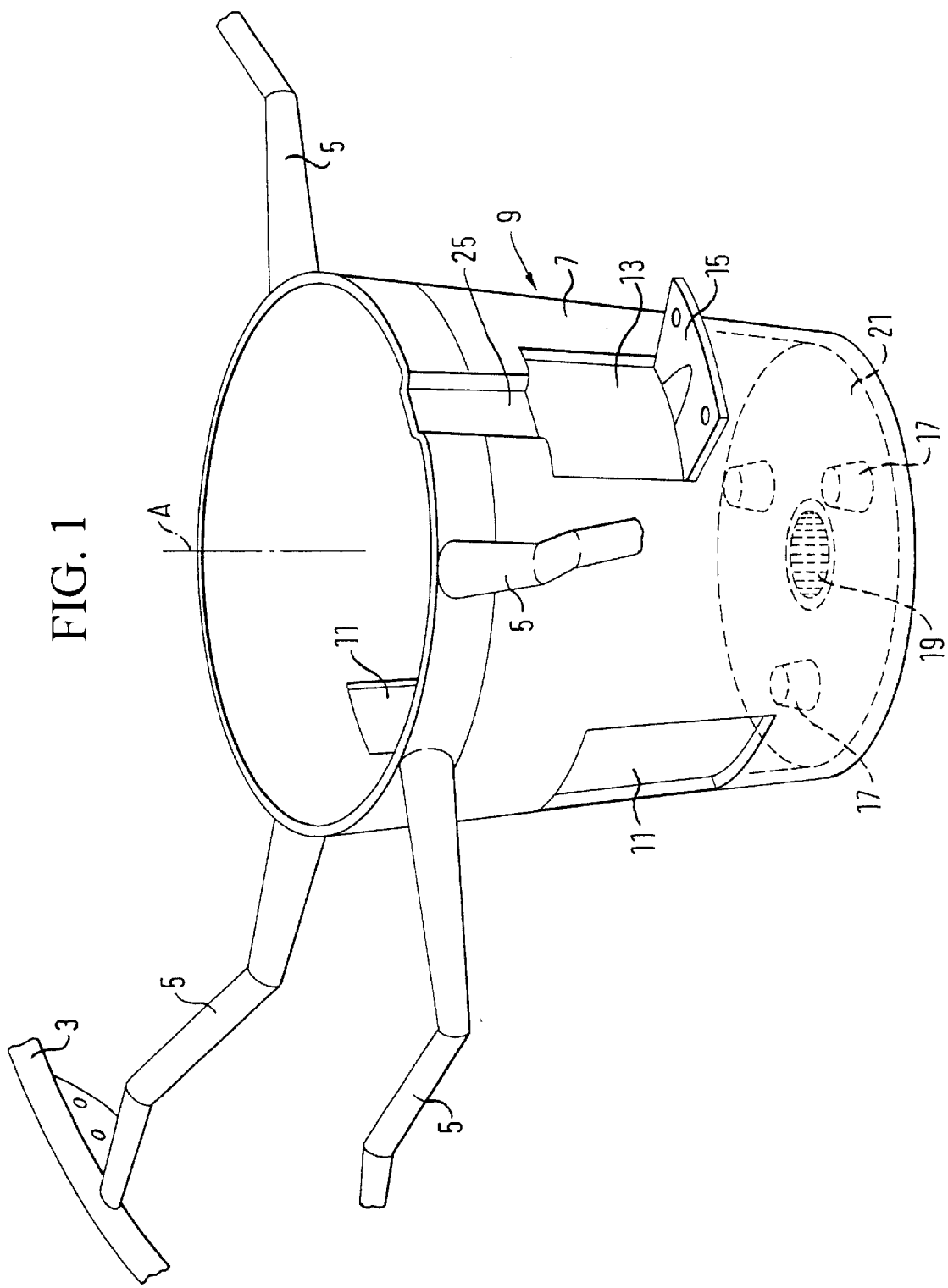
FIG. 1 shows a perspective view of the steering wheel skeleton as part of the vehicle steering wheel according to the invention.
Figure 2:
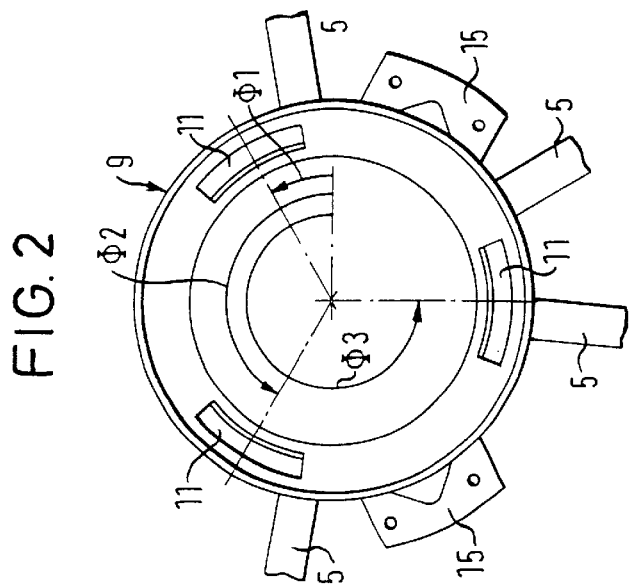
FIG. 2 shows a top view onto the hub region of the steering wheel skeleton shown in FIG. 1.

In FIG. 1 a steering wheel skeleton for a vehicle steering wheel is illustrated, which has a steering wheel rim 3, several spokes 5 and a steering wheel hub 7. The steering wheel hub 7 is constructed in a cup shape and is open towards the driver. The cup-shaped hub is referred to as a holding member in the following. It is to be stressed that it is also possible to place a separate holding member onto a disc-shaped hub and fasten it thereto, in order to provide a mounting for a gas bag module. Three window-like recesses 11 are provided on the periphery of the holding member so as to be uniformly distributed in the cylinder wall (cf. FIG. 2), this holding member preferably being constructed in the form of a circular cylinder and bearing reference number 9. The angles $\Phi 1$ to $\Phi 3$ are intended to define the positions of the recesses 11 in circumferential direction. In addition to the recesses 11, there are two further recesses 13, in which the cut-out region of the cylinder wall is bent downwards and radially outwards, in order to provide a radial fastening flange 15 for the fastening of multifunction switches (not shown).

The end wall of the cup-shaped holding member has several pins 17 projecting axially inwards, which serve as stops for the gas bag module which is to be inserted into the holding member 9. 19 designates a hub extension on the end wall 21, with which the steering wheel is arrested on the steering shaft. The steering shaft (not shown) is in alignment with the longitudinal axis A of the vehicle steering wheel. The steering shaft can, however, also run eccentrically to the longitudinal axis A.

An axially extending guide groove 25 is formed by pressing in of the cylinder wall of the holding member and serves for the simplified insertion of the gas bag module into the holding member 9.

Figure 3:
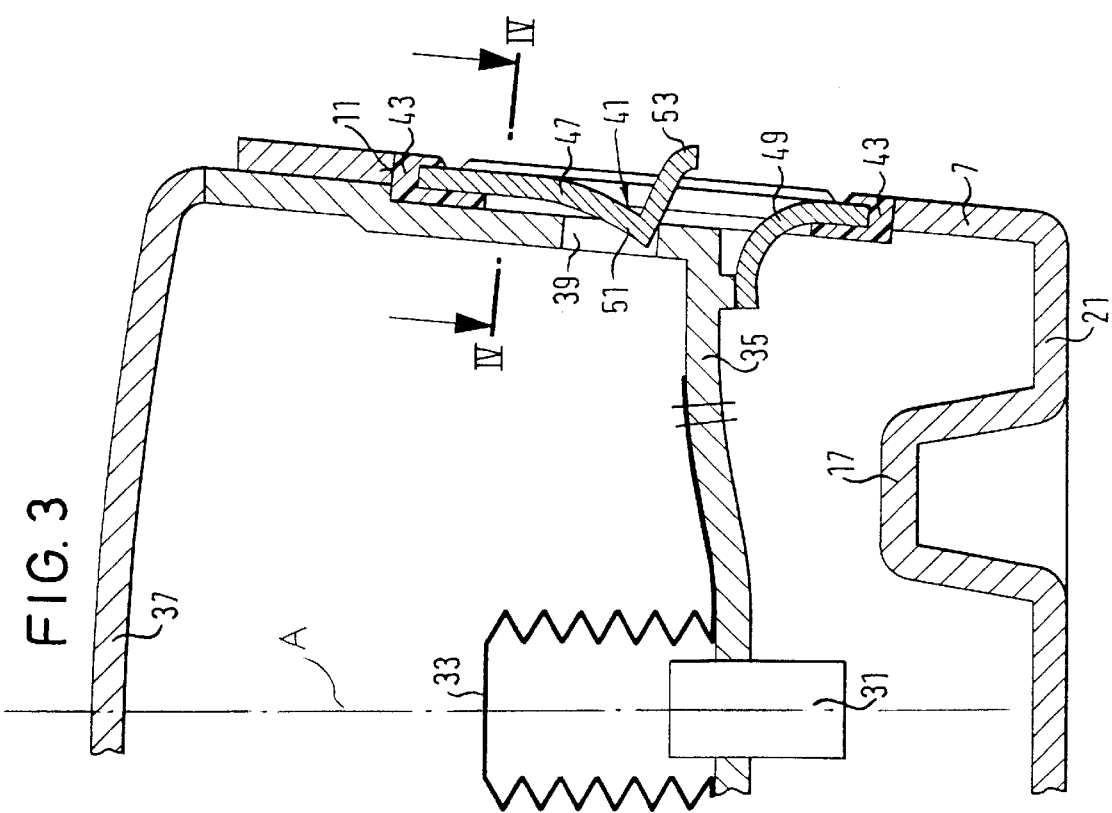
FIG. 3 shows a longitudinal section through the vehicle steering wheel in the region of the hub with the gas bag module inserted.

The gas bag module, which is illustrated only in sections in FIG. 3, has a gas generator 31, a gas bag 33 and also a cup-shaped generator carrier 35, which at the same time forms a kind of container for the gas bag module. A covering 37 on the front side closes the gas bag module off towards outside and is fastened to the generator carrier 35. The generator carrier 35, in the region of the recesses 11, likewise has recesses 39 which form part of a latching connection.

The gas bag module is fixed in the holding member 9 by means of three latching connections. The latching connections each consist of a spring element in the form of a deformed spring plate 41 and of the corresponding recess 39.

Each spring plate 41 consists of an elongated sheet metal part which has a surrounding plastic sheathing 43 in the region of its upper and lower end. The surrounding plastic sheathing 43 can also surround the spring plate 41 like a frame. The spring plate 41 has an H-shaped recess 45 which is formed by punching and defines two sheet metal tongues 47, 49. With this, the sheet metal tongues are only connected on one side with the remainder of the spring element 41 and, thus, only mounted on one side. The sheet metal tongue 47 forms a so-called first section and the sheet metal tongue 49 forms a so-called second section of the spring plate 41. The second section 49 is bent radially inwards, whereas the first section 47 is formed so as to have a V-shape in cross-section and projects with the tip of the "V" radially towards the longitudinal axis A. The section 47 has an upper part 51, illustrated in FIG. 3, extending gradually radially inwards, and a part 53, adjoining thereto, extending abruptly outwards.

The spring plate 41 and the sheathing 43 form an insert as a separate, premounted unit, which is pressed into the recess 11 from the inside and latches in place therein. This latching takes place by means of correspondingly deformed longitudinal edges of the spring plate 41, these forming a so-called third section 61 of the spring plate 41.

Figure 4:
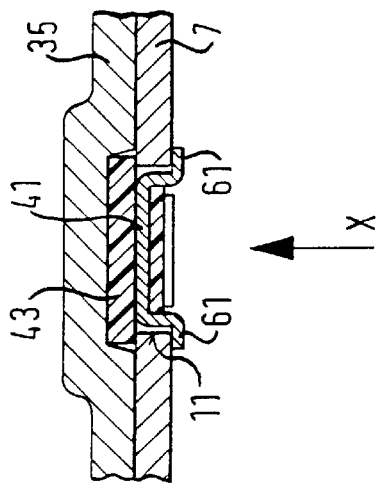
FIG. 4 shows a section along the line IV—IV in FIG. 3
Figure 5:
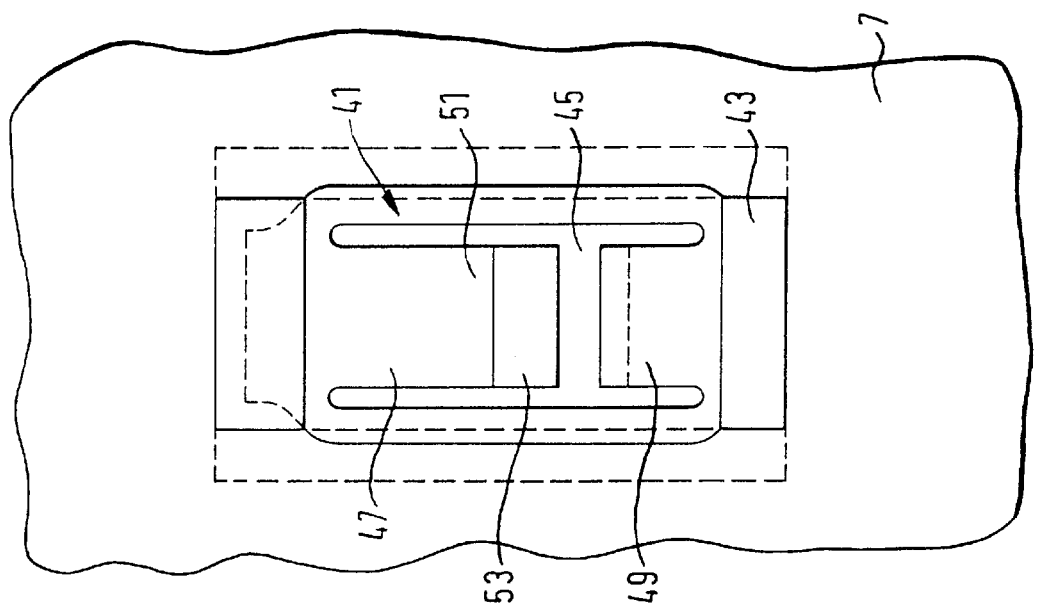
FIG. 5 shows a view of a spring element, constructed as an insert, as seen in the direction of the arrow X in FIG. 4.

When the three identical inserts are inserted from the inside of the cup-shaped holding member 9 into the corresponding recesses 11, this has the advantage that the gas bag module, which is inserted later, then prevents the inserts from falling out. The inserts in this case, because they project radially inwards, can also serve as a guide for the gas bag module, as FIG. 4 shows. The gas bag module, more precisely the generator holding plate 35, only has to have a corresponding guide groove.

On insertion of the likewise cup-shaped gas bag module into the holding member 9, the guide 25 and/or the radially inwardly projecting sheathing 43, shown in FIG. 4, serves for a longitudinal guide with which the gas bag module is also secured peripherally.

On pushing the gas bag module downwards, the bottom portion of the generator carrier 35 presses the first section 47 radially outwards until the recess 39 is reached, into which the section 47 engages to form a snap- or latching connection. Almost at the same time, the underside of the generator carrier 35 reaches the second section 49 and will rest thereon. In the basic position shown in FIG. 3, the second section 49 presses the gas bag module axially upwards so as to rest against the underside of the part 53 of the first section 47, so that the gas generator carrier is fixed in position and clamped between these two sections. Rattling noises therefore can not occur during driving, because this is a mounting which is free of play in the basic position.

To actuate the horn, the gas bag module must be pressed axially downwards until two contacts (one on the gas generator carrier and one on the end wall 21) touch each other. With this movement, the second section 49 is bent elastically. When the driver no longer presses onto the gas bag module, the second section 49 presses the gas bag module upwards again into the basic position shown in FIG. 3. The stops 17 can also bear contacts or microswitches which serve for actuation of the horn.

What is claimed is:

1. A vehicle steering wheel comprising:
   a longitudinal axis;
   a steering wheel hub;
   a holding member;
   at least one latching connection; and
   a gas bag module which is connected via said at least one latching connection with said holding member, said gas bag module being displaceably mounted in a direction of said longitudinal axis for actuation of a horn,
   said latching connection including a one-piece spring element and a recess, said spring element snapping into said recess and connecting said gas bag module and said holding member with each other to form a snap-in connection,
   said spring element moving said gas bag module back into a basic position upon actuation of the horn,
   said spring element having a first section providing said latching connection and a second section providing a restoring force upon actuation of the horn,
   said spring element having an H-shaped recess through which two sheet metal tongues are defined, said two sheet metal tongues extending into said recess and forming said first and second sections.

2. The vehicle steering wheel according to claim 1 wherein said first section of said spring element is V-shaped in cross-section.

3. The vehicle steering wheel according to claim 1 wherein said second section is a bent section of said spring element, said bent section being constructed as a spring plate and projecting radially inward toward said longitudinal axis.

4. The vehicle steering wheel according to claim 1 wherein said second section presses said gas bag module toward the basic position of said gas bag module, said second section pressing said gas bag module against said first section such that said gas bag module is mounted free of play in the basic position.

5. The vehicle steering wheel according to claim 1 wherein said spring element is a separate insert fastened to one of said holding member and said gas bag module.

6. A vehicle steering wheel comprising:
   a longitudinal axis;
   a steering wheel hub;
   a holding member;
   at least one latching connection; and
   a gas bag module connected via said at least one latching connection with said holding member, said gas bag module being displaceably mounted in a direction of said longitudinal axis for actuation of a horn, said latching connection including a one-piece spring element and a recess, said spring element having a surrounding plastic sheathing, said spring element snapping into said recess and connecting said gas bag module and said holding member with each other to form a snap-in connection, said spring element in addition moving said gas bag module back into a basic position upon actuation of a horn.

7. The vehicle steering wheel according to claim 6 wherein said spring element is a deformed spring plate.

8. The vehicle steering wheel according to claim 6 wherein said spring element is a separate insert fastened to one of said holding member and said gas bag module.

9. A vehicle steering wheel comprising:

a longitudinal axis;

a steering wheel hub;

a holding member;

at least one latching connection; and a gas bag module connected via said at least one latching connection with said holding member, said gas bag module being displaceably mounted in a direction of said longitudinal axis for actuation of a horn, said latching connection including a one-piece spring element and a recess, said spring element snapping into said recess and connecting said gas bag module and said holding member with each other to form a snap-in connection, said spring element moving said gas bag module back into a basic position upon actuation of a horn, said holding member being constructed in the form of a cylinder and at least one window recess being provided on a periphery of said holding member, said spring element being part of a separate insert pressed into said window recess of said holding member.

10. The vehicle steering wheel according to claim 9 wherein said spring element is a deformed spring plate.

11. The vehicle steering wheel according to claim 9 wherein said holding member is constructed in a cup shape, said gas bag module being inserted into said cup shape.

12. The vehicle steering wheel according to claim 9 wherein said holding member has an axially extending guide groove for positioning said gas bag module such that said gas bag module has a predetermined angular position relative to said holding member.

13. A vehicle steering wheel comprising:

a longitudinal axis;

a steering wheel hub;

a holding member;

at least one latching connection; and a gas bag module connected via said at least one latching connection with said holding member, said gas bag module being displaceably mounted in a direction of said longitudinal axis for actuation of a horn, said latching connection including a one-piece spring element and a recess, said spring element snapping into said recess and connecting said gas bag module and said holding member with each other to form a snap-in connection, said spring element moving said gas bag module back into a basic position upon actuation of a horn, said holding member having an axially extending guide groove formed in a wall of said holding member, said guide groove facilitating insertion of said gas bag module into said holding member.

14. The vehicle steering wheel according to claim 13 wherein said holding member is constructed in a cup shape, said gas bag module being inserted into said cup shape.

15. The vehicle steering wheel according to claim 13 wherein said spring element has an H-shaped recess defining a first section and a second section, said first section providing part of said latching connection, said second section moving said gas bag module into the basic position.

16. A vehicle steering wheel comprising:

a holding member for fastening to a steering wheel hub, said holding member having a longitudinal axis; and a gas bag module connected to said holding member by a latching connection, said gas bag module being displaceably mounted for movement from a basic position in an axial direction for actuating a vehicle horn, the latching connection comprising a one-piece spring element, said spring element snapping into a recess of said holding member, said spring element moving said gas bag module into the basic position subsequent to actuating the vehicle horn, said spring element having a first section and a second section, said first section providing the latching connection between said gas bag module and said holding member, said second section providing a force for moving said gas bag module to the basic position subsequent to actuating the vehicle horn, said spring element having an H-shaped recess defining said first section and said second section, said first section and said second section being sheet metal tongues of said spring element.

17. A vehicle steering wheel comprising:

a holding member for fastening to a steering wheel hub, said holding member having a longitudinal axis; and a gas bag module connected to said holding member by a latching connection, said gas bag module being displaceably mounted for movement from a basic position in an axial direction for actuating a vehicle horn, the latching connection comprising a one-piece spring element, said spring element snapping into a recess of said holding member, said spring element moving said gas bag module into the basic position subsequent to actuating the vehicle horn, said spring element having a first section and a second section, said first section providing the latching connection between said gas bag module and said holding member, said second section providing a force for moving said gas bag module to the basic position subsequent to actuating the vehicle horn, said spring element having a plastic sheathing surrounding said spring element.

18. A vehicle steering wheel comprising:

a holding member for fastening to a steering wheel hub, said holding member having a longitudinal axis; and a gas bag module connected to said holding member by a latching connection, said gas bag module being displaceably mounted for movement from a basic position in an axial direction for actuating a vehicle horn, the latching connection comprising a one-piece spring element, said spring element snapping into a window recess of said holding member, said spring element moving said gas bag module into the basic position subsequent to actuating the vehicle horn, said spring element having a first section and a second section, said first section providing the latching connection between said gas bag module and said holding member, said second section providing a force for moving said gas bag module to the basic position subsequent to actuating the vehicle horn, said spring element being part of a separate insert pressed into said window recess of the holding member.

19. A vehicle steering wheel comprising:

a holding member for fastening to a steering wheel hub, said holding member having a longitudinal axis; and a gas bag module connected to said holding member by a latching connection, said gas bag module being displaceably mounted for movement from a basic position in an axial direction for actuating a vehicle horn, the latching connection comprising a one-piece spring element, said spring element snapping into a recess of said holding member, said spring element moving said gas bag module into the basic position subsequent to actuating the vehicle horn, said spring element having a first section and a second section, said first section providing the latching connection between said gas bag module and said holding member, said second section providing a force for moving said gas bag module to the basic position subsequent to actuating the vehicle horn, said holding member having an axially extending guide groove formed in a wall of said holding member, said guide groove facilitating insertion of said gas bag module into said holding member.

* * * * *

UNITED STATES PATENT AND TRADEMARK OFFICE
CERTIFICATE OF CORRECTION

PATENT NO. : 6,672,613 B2
DATED : January 6, 2004
INVENTOR(S) : Patrik Schuler

It is certified that error appears in the above-identified patent and that said Letters Patent is hereby corrected as shown below:

Column 4,
Line 52, after "claim" change "1" to -- 3 --.

Signed and Sealed this

Twenty-seventh Day of July, 2004

JON W. DUDAS
*Acting Director of the United States Patent and Trademark Office*